United States Patent [19]

Huelsman

[11] 4,215,414

[45] Jul. 29, 1980

[54] PSEUDOGAUSSIAN VIDEO OUTPUT PROCESSING FOR DIGITAL DISPLAY

[75] Inventor: Kenneth A. Huelsman, Carlsbad, Calif.

[73] Assignee: Hughes Aircraft Company, Culver City, Calif.

[21] Appl. No.: 884,325

[22] Filed: Mar. 7, 1978

[51] Int. Cl.² .......................... G06F 3/14; H04N 5/14
[52] U.S. Cl. ..................................... 364/515; 340/728; 340/750; 358/138; 358/280; 358/284
[58] Field of Search ......................... 364/514, 515, 521; 340/324 R, 324 A, 324 AD, 728, 750; 358/138, 263, 280, 284

[56] References Cited

U.S. PATENT DOCUMENTS

| | | | |
|---|---|---|---|
| 3,573,789 | 4/1971 | Sharp et al. | 340/324 |
| 3,878,536 | 4/1975 | Gilliam | 340/324 AD |
| 3,921,164 | 11/1975 | Anderson | 340/324 AD |
| 3,983,320 | 9/1976 | Ketcham et al. | 340/750 X |
| 3,996,421 | 12/1976 | Pruznick et al. | 178/7.3 D |
| 4,023,165 | 5/1977 | Holt et al. | 340/324 AD X |
| 4,032,977 | 6/1977 | Liao | 358/280 |
| 4,038,668 | 7/1977 | Quarton | 340/324 AD X |
| 4,068,266 | 1/1978 | Liao | 358/280 |
| 4,127,873 | 11/1978 | Katagi | 358/138 X |
| 4,158,838 | 6/1979 | Pruznick et al. | 340/750 |

FOREIGN PATENT DOCUMENTS

| | | | |
|---|---|---|---|
| 1193497 | 6/1970 | United Kingdom | 364/515 |
| 1277013 | 6/1972 | United Kingdom | 364/515 |
| 1299842 | 12/1972 | United Kingdom | 364/515 |
| 1336079 | 11/1973 | United Kingdom | 364/515 |
| 1393532 | 5/1975 | United Kingdom | 364/515 |
| 1453589 | 10/1976 | United Kingdom | 364/515 |
| 1510504 | 5/1978 | United Kingdom | 364/515 |
| 1510978 | 5/1978 | United Kingdom | 364/515 |

Primary Examiner—Jerry Smith
Attorney, Agent, or Firm—Walter J. Adam; W. H. MacAllister

[57] ABSTRACT

A method and apparatus for generating a pseudogaussian characteristic in the display of video information presented in digital form from a read-write memory that is continuously updated as the scan input requires, and read out one line at a time, preferably with conventional TV fields of odd and even interlaced lines. Picture elements (pixels) of each line L read for display are summed with a predetermined fraction of the sum of the values of corresponding pixels of adjacent lines L−1 and L+1, thus forming a vertical pseudogaussian calculation for the pixels of line L. Horizontal pseudogaussian calculation of the pixels is then performed in a similar manner using two pixel delay elements connected in cascade and connected to an adder to presum values of pixels P−1 and and P+1 as an input to a second adder which sums the output of the first adder, divided by a predetermined value, with the value of pixel P.

4 Claims, 11 Drawing Figures

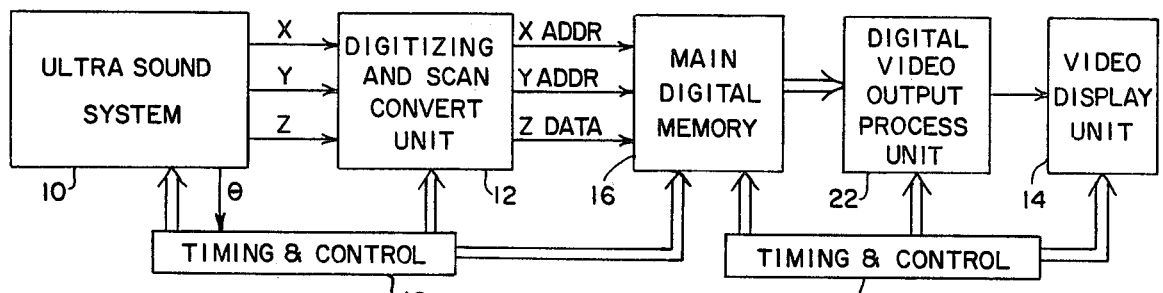
FIG. 1
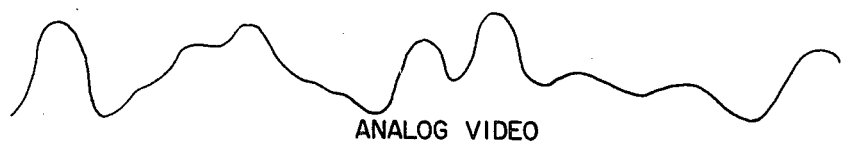
FIG. 2  ANALOG VIDEO
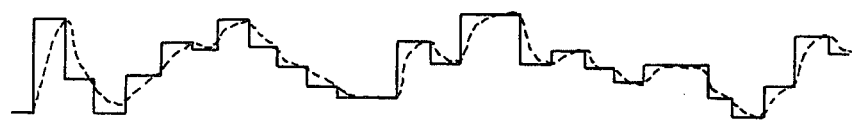
FIG. 3  QUANTIZED VIDEO (DASHED ANALOG FILTERED)
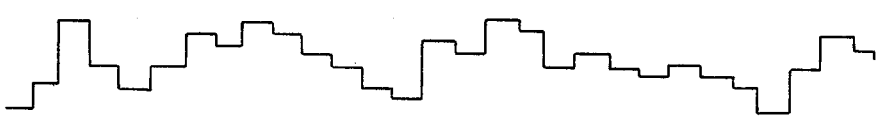
FIG. 4  DIGITAL FILTERED
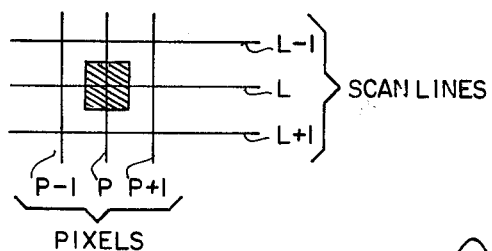
FIG. 5
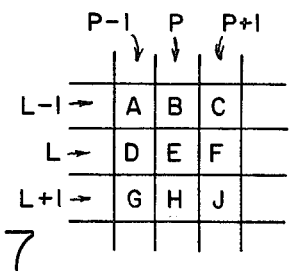
FIG. 7
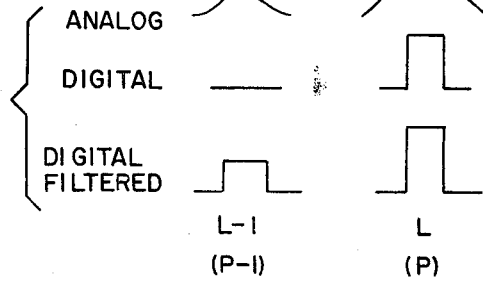
FIG. 6
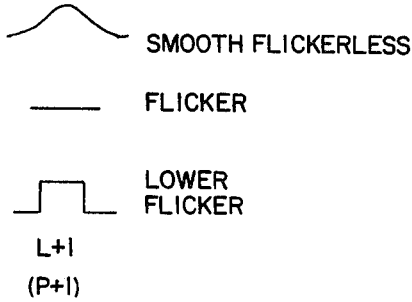

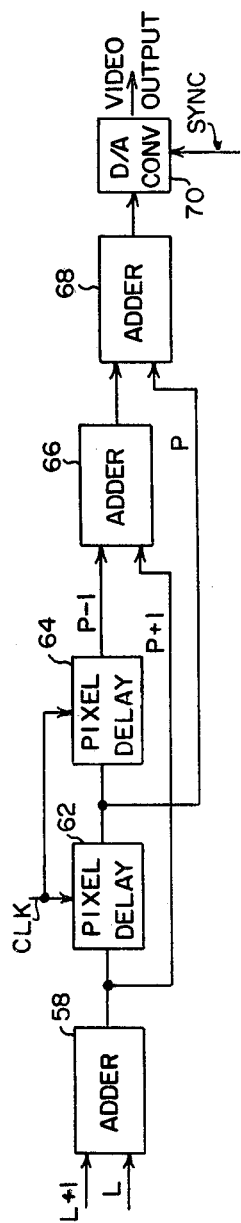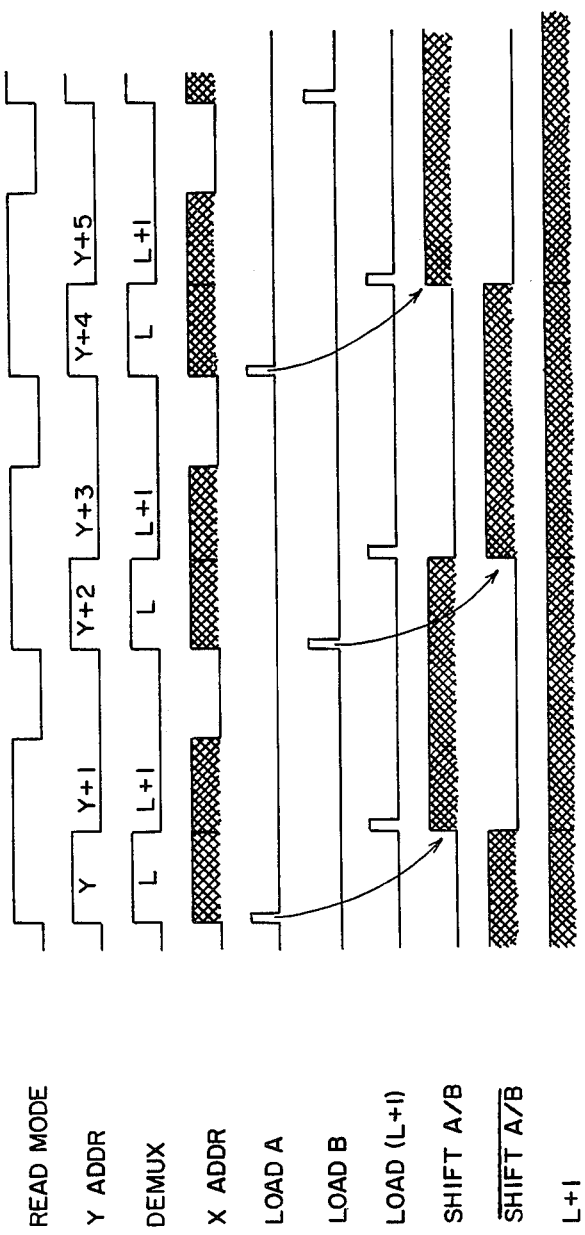

PSEUDOGAUSSIAN VIDEO OUTPUT PROCESSING FOR DIGITAL DISPLAY

BACKGROUND OF THE INVENTION

This invention relates to a digital system for video display, and more particularly to a method and apparatus for digital video output processing to approximate the desirable smooth picture characteristics of an analog video output such as is generated by a TV camera or scan converter tube.

There are many reasons for using a digital system for video display. One is to provide a more versatile video scan converter than is possible with an analog scan converter tube. However, a digital video system does have its own problems. A primary problem is that the quantified picture elements (pixels) present a quantified or structured appearance of the display.

What is required in a digital system for video display is video output processing to transform the structured output to an output that emulates the gaussian characteristics of an analog output. The transformed digital output may then be displayed with the picture characteristic of an analog video system. An advantage is not only reduction of the quantization effects characteristic of a digital display system, but also a reduction of interfield flicker typical of digital display systems.

In the past, the digital output transformation has usually depended upon analog filtering to smooth the quantified pixels. A problem with that technique is that the smoothing occurs only along the horizontal axis. Also analog filters involve phase shifts and resultant rise time characteristics which do not match the desired gaussian function. In order to transform the digital video output to an output which emulates an analog video output, filtering would be required in both axes, and that simply would not be possible with just a filter to transform the digital video output into an analog video output.

SUMMARY OF THE INVENTION

In accordance with the present invention, a pseudogaussian distribution is provided in the digital video output for a single video event in both display axes in order that when displaying any one line, the information from at least immediately adjacent lines is also partially imaged, and within any one line, the information from similarly processed pixels of the same line will also be partially imaged utilizing at least immediately adjacent pixels. This partial imaging of surrounding each pixel of a line displayed, emulates the gaussian characteristics of an analog system. The partial imaging technique is carried out for a given line L by reading at least line L+1 out of digital memory, and preferably delaying that line one line scanning interval while line L is read through a demultiplexer in order to present at the output of the delay means a video data line L−1 to add pixel by pixel to line L+1, with a predetermined weighting factor W less than unity (typically 0.5). Following that, the resulting weighted sums for the pixels of the line L are transmitted through two cascaded pixel delay elements in order to make adjacent pixels P−1 and P+1 available for addition to each pixel P, again with a predetermined weighting factor W less than unity (typically 0.5), with the result that each pixel value has a contribution from not only adjacent pixels in the vertical and horizontal axis, but also a contribution from diagonally adjacent pixels for an approximation of gaussian distribution all around each pixel on a pixel by pixel basis while display takes place. For a more simple, but effective implementation, the line delay means used for presentation of line L−1 could be omitted. Lines L and L+1 would be read out of memory using a demultiplexer as before. This simple implementation would effect unidirectional vertical filtering and bidirectional horizontal filtering that, in practice, approaches the effectiveness of the full L−1, L and L+1 line filtering. Alternatively, all three lines L−1, L and L+1 may be read and brought into coincidence, with suitable delay means possibly even with half pixel skewing of line L in respect to line L−1 and L+1 for vertical filtering of two pairs of pixels diametrically opposite each other instead of one pair. Full filtering could also be achieved without the line delay means by using a demultiplexer to read pixels from all three lines, and forming the weighted sum of corresponding pixels of all three lines directly.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a block diagram illustrating an exemplary environment for the invention.

FIG. 2 illustrates a typical video signal.

FIG. 3 illustrates the video signal of FIG. 2 quantized and analog filtered.

FIG. 4 illustrates the quantized signal of FIG. 3 subjected to digital filtering.

FIGS. 5, 6 and 7 are graphics useful in understanding the objectives of the invention.

FIG. 10 is a timing diagram for FIG. 9.

FIG. 11 illustrates a variant of the embodiment of FIG. 9.

DESCRIPTION OF PREFERRED EMBODIMENTS

Figure 8:
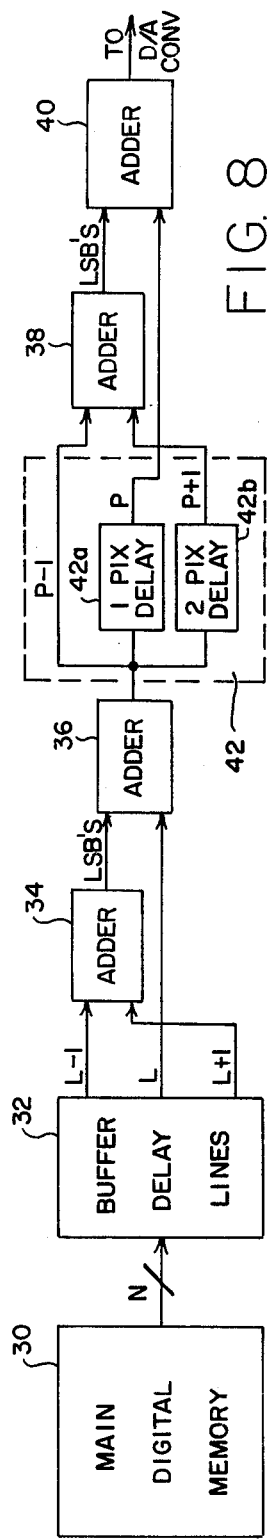
FIG. 8 is a block diagram illustrating the general organization and operation of the invention.

Before describing a preferred embodiment, the purpose for and advantages of the invention will first be further described with reference to FIG. 1. The ultimate purpose is to approximate the desirable smooth picture characteristic of an analog display, such as generated by an ultrasound system 10 of the type referred to in U.S. Pat. No. 3,864,660, where the X, Y and $\theta$ information provide coordinate data for the analog video signal Z. This information is used by a digitizing and scan converting unit 12 to convert the video signal Z to digital form (Z data) in a coordinate system referred to a video display unit with X and Y addresses for each picture element (pixel). The X and Y addresses are used to store the Z (video) data in a main digital memory 16 from which the data is read for display, one line at a time, in alternate fields of odd and even lines. A timing and control unit 18 synchronizes operation of the digitizing and scan converting unit 12 and the main memory 16 while storing video data. A second timing and control unit 20 synchronizes operation of the main memory with the video display unit while reading out video data.

The video data could be displayed directly out of the memory 16, but each pixel is quantized to one of $2^n$ values, where n is the number of binary digits (bits) in the Z data. Therefore, the output video from the ultrasound system, or equivalent source (e.g., TV camera) shown in FIG. 2, is quantized. FIG. 3 shows a typical quantized video signal. Each pixel is stored as an n-bit number representing the quantized level of the video signal at the time the pixel sample is taken. If the quantized signal of FIG. 3 were to be displayed, the display would have a quantified or structured appearance, whereas the actual video output of events is generally gaussian. This can be better appreciated by considering a single impulse or video event which, when quantized, produces a squarewave video event or pulse. If displayed as a squarewave over several pixels and lines, the result is a rather "hard" image event with a well defined edge and uniform gray scale. The problem then is that this does not display the event as one would expect it to be displayed for the reason that an analog source of a single video event is generally gaussian.

The important feature of analog video sources is that for a single impulse or squarewave video event, the analog video signal has essentially equal skirts on each side of the main video pulse due to the inherent gaussian characteristics of the analog signal source. Therefore the quantized display shown in FIG. 3 is not a very faithful reproduction of the analog signal. It would be helpful to use an analog filter of the video output to the display system. The result would then be as represented by the dotted line in FIG. 3, but that is still a distortion of the true analog video of FIG. 2. It would be preferable to use digital filtering to produce a more faithful quantized reproduction of the analog video, as shown in FIG. 4, by providing a single video event with skirts characteristic of an analog signal source. This will be more explicitly described with reference to FIGS. 5, 6 and 7.

In FIG. 5 there is shown a small square representing a single video event which is scanned horizontally. When scanned, the analog system (e.g. TV camera) will have some response in line $L-1$, and $L+1$, as well as line L, with the largest response in line L as shown in FIG. 6. This results when scanning any one line due to the adjacent lines picking up the skirts of the impulse event. Similar responses occur in line L for pixels intervals before and after the event. This is because the skirt of the impulse rises slowly and falls slowly compared to the pulse width (scan interval). When processed in analog form, the event will be displayed as a smooth flickerless spot, but if sampled and quantized, for processing in digital form, the lines before and after (and the pixels before and after) will be zero, resulting in a "hard" display of the event.

To improve the display, of a system using digital processing of the video, such as for scan conversion, the present invention provides digital filtering in both the horizontal and vertical dimension to provide adjacent pixels in lines $L-1$ and $L+1$ (and adjacent pixels in columns $P-1$ and $P+1$) with some amplitude approximating the gaussian characteristics of the signal source. The result is lower flicker in the display, giving the viewer a softer (smoother) image which is more like smooth flickerless display achieved using analog processing. This digital filtering in both the horizontal and vertical directions is provided by a digital video output processing unit 22 (FIG. 1) such that for a 3 by 3 matrix of pixels as shown in FIG. 7, the center pixel E (line L, pixel P) will have a value dependent on the weighting, W, used in adding pixels in the vertical and horizontal directions as follows:

$$P_L = E + W(B+D+F+H) + W^2(A+C+G+J)$$

where the weighting factor is less than unity. Assuming $W = 0.50$ the value of the pixel will be:

$$P_L = E + 0.5(B+D+F+H) + 0.25(A+C+G+J)$$

Assuming all squares A through J have a full scale value of 1, then the value of the pixel in the center is:

$$P_L = 1 + 0.5(4) + 0.25(4) = 4$$

This indicates a 4 times expansion of gray scale range required of the digital-to-analog converter for the video display unit. Changing the weighting factor to 0.25 for adjacent pixels results in a pixel value of:

$$P_L = E = 0.25(B+D+F+H) + 0.0625(A+C+G+J)$$

Again assuming a full scale value of 1, the pixel value is:

$$P = 1 + 0.25(4) + 0.0625(4) = 2.25$$

This value is considered realistic in terms of both filtering capability (horizontally and vertically) and flicker reduction from an interlaced line display system. The amount of "gaussian" value to be added in can be adjusted either by shifting down the adders bits in a digital adder, or by performing a more elaborate multiplication (or division by the reciprocal of the weighting factor). It would also be possible to use separate digital-to-analog converters for B, D, F, H and A, C, G, J followed by analog summing. Further improvement could be achieved by skewing line L to the left, for example, relative to lines $L-1$ and $L+1$ by a half pixel, and digital filtering with all adjacent pixels in an analogous manner. Still further improvement could be achieved by processing for pseudogaussian characteristics over more than one line on each side, and over more than one pixel similarly processed on each side.

Before proceeding with a description of a preferred embodiment, the organization of the invention will first be described with reference to FIG. 8 wherein a main memory 30 for digitized video output of a system is shown connected to buffer delay lines 32 which receive the video output and present three lines at a time to a pair of adders 34 and 36 with the following pattern:

|  | $L-1$ | L | $L+1$ |
| --- | --- | --- | --- |
|  | 0 | 1 | 2 |
|  | 2 | 3 | 4 |
|  | . | . | . |
|  | . | . | . |
| ODD | . | . | . |
| FIELD | 14 | 15 | 16 |
|  | 16 | 17 | 18 |
|  | . | . | . |
|  | . | . | . |
|  | . | . | . |
|  | 1 | 2 | 3 |
|  | 3 | 4 | 5 |
|  | . | . | . |
| EVEN | . | . | . |
| FIELD | . | . | . |
|  | 13 | 14 | 15 |
|  | 15 | 16 | 17 |

Lines L−1 and L+1 are added through a binary adder 34 and the output divided by $2^n$ is added to line L through a binary adder 36, one N-bit pixel at a time. All pixel data is processed in parallel. Therefore, all digital data lines are to be understood to be comprised of N bit lines, with N typically equal to 4. If the output of the adder 34 is to be weighted by 0.25, for example, that output must be divided by $2^2=4$. That is easily accomplished by adding the N−2 most significant bits to the N−2 least significant bits of the pixel value in line L. For instance, assuming 4-bit pixels, the maximum number of bits in a sum will be 5. By adding the three most significant bits to the three least significant bits of the 4-bit pixel value of line L, the sum is effectively divided by four, which is a multiplication by the weighting factor 0.25. The vertically filtered video output of the adder 36 is then applied to a pair of adders 38 and 40 through pixel delay elements 42 which receive a line of video data, one pixel at a time and present it to the adders with the following pattern:

| P−1 | P | P+1 |
|---|---|---|
| 0 | 1 | 2 |
| . | . | . |
| . | . | . |
| . | . | . |
| 13 | 14 | 15 |
| 14 | 15 | 16 |
| 15 | 16 | 17 |
| . | . | . |
| . | . | . |
| . | . | . |

The adder 38 sums the values of pixels P−1 and P+1, and the adder 40 adds the sum (divided by the reciprocal of the weighting factor) to the value of pixel P to develop the pixel value transmitted to a digital-to-analog converter for display.

Figure 9:
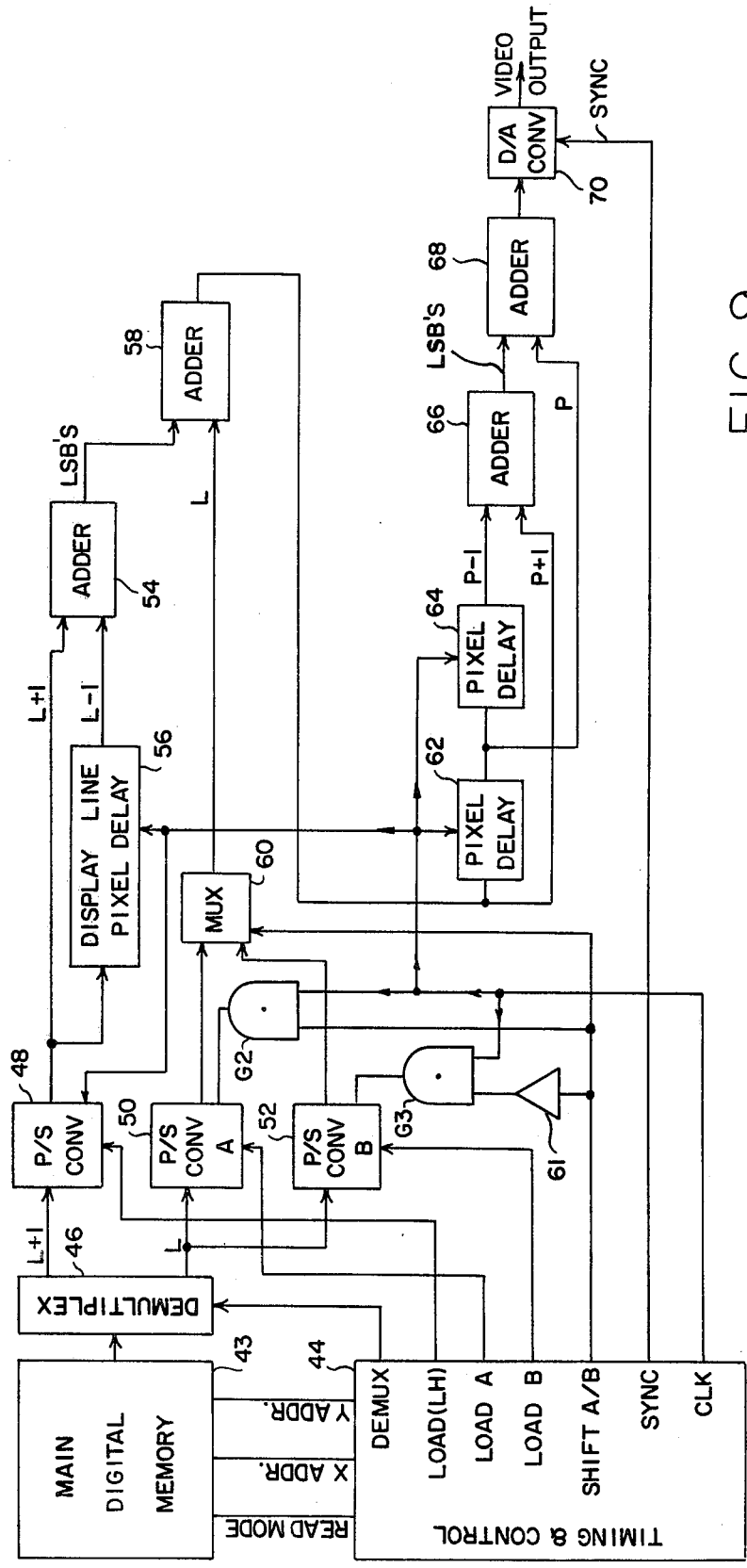
FIG. 9 illustrates a preferred embodiment.

It should be noted that for vertical filtering, the lines to be operated on are the odd (or even) lines with the adjacent lines, which requires reading at least line L and line L+1, and storing line L+1 through one extra line delay for use during the next line filtering cycle. This requires reading each line L directly into the adder 36 while delaying it through one delay line before presenting it to the adder 34 and using another delay line to connect the one delay line to the other input of the adder 34. The problem with that approach is that the first two lines of vertically filtered data will not be properly filtered. It would be better to read lines L and L+1 in a multiplexed manner, and to demultiplex them into the adders 34 and 36, with only line L+1 being stored in a delay line for use during the next line scanning cycle to present the line L−1 to the adder 36. Just the first line of every odd and even frame would then be only partially filtered, but that is not entirely objectionable. In fact, a simple but effective implementation would eliminate the one display line delay and use only lines L and L+1. This results in unidirectional vertical filtering which in actual practice approaches the effectiveness of the full filter. Still another alternative would be to multiplex the reading of all three lines L−1, L and L+1, and to demultiplex them for presentation to the adders. The result would be full bidirectional vertical filtering from the very first line without a delay line. However, the preferred embodiment to be described with reference to FIG. 9 is to read lines L and L+1 in a multiplexed manner, and to employ a delay line to store line L+1 for use during the next line scan cycle as line L−1.

The situation for horizontal filtering is not complicated by the need, or desire, to interlace for flicker free display. Consequently, the delay elements 42 of FIG. 8 may be implemented with just two delay elements, one 42a providing just one pixel delay to present the pixel P to the adder 40, and one 42b providing two pixel delays to present pixel P+1 to the adder 38. Pixel P−1 is applied directly to the adder 38 as shown. Since each pixel is a N-bit word presented in parallel, a delay of one pixel may be implemented with one bank of N flip-flops, and a delay of two pixels may be implemented with two banks of N flip-flops in cascade. The buffer delay lines 32 would similarly be implemented the necessary number of banks of flip-flops in cascade, each bank storing one pixel. The video data would be processed through these delays and adders in response to clock pulses in the usual manner well known to those skilled in the art of designing synchronous digital systems.

The preferred implementation for digital video output processing will now be described with reference to FIG. 9 wherein the main memory 43 is essentially the same as the main memory 16 of FIG. 1. The balance of FIG. 9 is then the digital video output processing unit 22 of FIG. 1 with a timing and control unit 44 providing the timing signals of FIG. 10 for synchronous control of the main memory and the digital video output processing unit.

The first timing signal out of unit 44 is a main memory read mode signal which enables the memory to read out two lines, pixel by pixel, in a multiplexed mode, first one line L for an address (Y ADDR) and then the next line L+1 of a frame. Note that the line L will be odd (or even) for interlaced line display and the next line will be even (or odd). The multiplexed data out of the main memory is demultiplexed by a demultiplexer 46 in response to a demultiplex (DEMUX) signal. The address for the pixels is controlled by a signal (X ADDR) that is periodically incremented to provide for reading out 16 pixels at a time in parallel. The demultiplexer thus provides the pixel data for lines L and L+1 on separate lines. The pixel data read is first converted from parallel to serial form by parallel-to-serial converters (P/S CONV) 48 and 50 and 52, but the bits of each pixel are handled in parallel. To accomplish demultiplexing, there are two load signals, LOAD A and LOAD B, generated for the parallel-to-serial converters 50 and 52 in order to be able to load one while shifting the other out, but only one load signal, LOAD (L+1) is generated for the parallel-to-serial converter 48. Thus, the converter 48 provides the demultiplexed line L+1 while the converters 50 and 52 together provide the demultiplexed line L. Two parallel-to-serial converters are required for the line L because pixels of a given line L in a converter must be held in overlapping time with pixels of the next line L in order to have the pixels of the given line L and of the line L+1 read out of the converters 48 and 50, or 52, synchronized.

The output (L+1) of the parallel-to-serial converter 48 is applied directly to an adder 54 and to a delay means 56 for providing one display line delay, such as a shift register having N stages for a line of pixels, each stage having n bits, i.e., by a shift register n bits wide. The output of the delay means 56 is applied to the adder 54 which adds lines L+1 and L−1. The least significant N-1 bits are applied to an adder 58 for addition to line L from converter 50, or 52, via multiplexer (MUX)

60, depending upon which of two gates G2 and G3 is enabled to transmit clock pulses to the parallel-to-serial converters (shift registers) 50 and 52. Note that the parallel-to-serial converter (shift register) 48 will receive clock pulses continuously. The AND gates G2 and G3 are alternately enabled by a signal SHIFT A/B, and its complement produced through an inverter 61. The signal SHIFT A/B is also applied to the multiplexer 60 to transmit the line L to the adder 58 from the converter 50 while it is receiving clock pulses from the gate G2, and from the converter 50 while it is receiving clock pulses. The signal SHIFT A/B thus not only gates clock pulses to the converters 50 and 52 but also connects the outputs of those converters to the adder alternately.

The serial pixel output of the adder 58 is applied to a first pixel delay element 62 (bank of N flips-flops) and then to a second pixel delay element 64 (bank of N flip-flops). That provides pixel P+1 at the input of the first pixel delay element and the pixels P and P−1 at the outputs of the first and second delay elements, respectively. Pixels P+1 and P−1 are added in an adder 66, and the sum (P+1)+(P−1) is added to pixel P in an adder 68. The output of the adder is applied to a digital-to-analog converter 70 to provide an analog video out signal synchronized by a line synchronizing signal (SYNC) which blanks the output of the digital-to-analog converter between line sweeps of a cathode ray tube (not shown).

As noted hereinbefore, unidirectional vertical filtering with bidirectional horizontal filtering could be, and has been, effectively used. To accomplish that, the delay line 56 and adder 54 are omitted so that the pixel values of line L+1 multiplied by a weighting factor W are added directly to the pixel values of the line L, as shown in FIG. 11. All of the rest of the system shown in the embodiment of FIG. 9 remains the same.

Although particular embodiments of the invention have been described and illustrated herein, it is recognized that modifications and variations may readily occur to those skilled in the art. For example, although filtering has been illustrated over a 3×3 array of pixels for each pixel of a line displayed (or a 3×2 array in the case of unidirectional vertical filtering), or the equivalent in the case of skewing line L relative to lines L−1 and L+1, filtering could also be achieved over a greater array of N×N pixels, where N may be 5, for example.

What is claimed is:

1. In a system having a memory for storing video data for display in an interlaced manner such that all odd lines are first displayed in a frame, and then all even lines, one line at a time, a method for generating a pseudogaussian characteristic in the display of video data comprising the steps of reading out two adjacent lines L and L+1 from memory during the same line readout time interval, delaying line L+1 one line interval for presentation as line L−1 in the processing when a subsequent set of lines L and L+1 are read from memory for display of the next line L, reading out said subsequent set of lines L and L+1 from memory during the same readout time interval, summing the value of each picture element of the next line L readout of said memory for display with a predetermined fraction of the sum of the values of the diametrically opposite picture elements in at least immediately adjacent subsequent lines L+1 and L−1, and summing the value of each picture element P of the next line L thus processed with a predetermined fraction of the sum of the values of similarly processed picture elements of the same next line L utilizing at least immediately adjacent picture elements P−1 and P+1.

2. In a system for display of video data from a digital memory, the combination comprising;
    means for reading a line to be displayed and at least one adjacent line for processing prior to display;
    means for adding the value of each picture element P of said line to be displayed to a predetermined fraction of a corresponding picture element P from said at least one adjacent line to produce a vertically filtered line of picture elements, and
    means for adding the value of each vertically filtered picture element of said line to be displayed to a predetermined fraction of the values of adjacent picture elements P+1 and P−1 on each side, thereby to produce a vertically, diagonally and horizontally filtered line of picture elements.

3. The combination of claim 2 wherein one adjacent line of video data is read, and where said line of data to be displayed is a line L in one frame of odd or even lines, and the adjacent line is line L+1, and the lines L and L+1 are read from said memory by multiplexing, said combination including means for demultiplexing said video data into two lines of video data in phase, element by element of picture elements, and further including delay means for delaying said line L+1 one line display interval, whereby said line L+1 for a given line L is presented as an adjacent line L−1 which just follows the next line of video data to be processed for display, and means for adding each picture element P of the line L+1 to a corresponding picture element P of the line L−1 out of said delay means, and where said means for adding the value of each picture element P of said line to be displayed receives a predetermined fraction of a corresponding picture element P from the line L+1 added to a predetermined fraction of a corresponding picture element P from the line L−1 whereby to produce bidirectional vertical filtering.

4. The combination of claim 2 wherein two adjacent lines of video data are read, one on each side of said line of video data to be displayed, one being a line L+1 ahead and one being a line L−1 behind, said combination including means for delaying said lines of data read by line interval periods to synchronize all three lines L−1, L, and L+1 with respect to their corresponding picture element, and means for adding each picture element P of the line L+1 to a corresponding picture element P of the line L−1 out of said delay means, and where said means for adding the value of each picture element P of said line to be displayed receives a predetermined fraction of a corresponding picture element P from the line L+1 added to a predetermined fraction of a corresponding picture element P from the line L−1 thereby to produce bidirectional vertical filtering.

* * * * *